(No Model.)
T. H. BRADISH.
ANIMAL TRAP.
No. 596,800.　　　　　Patented Jan. 4, 1898.
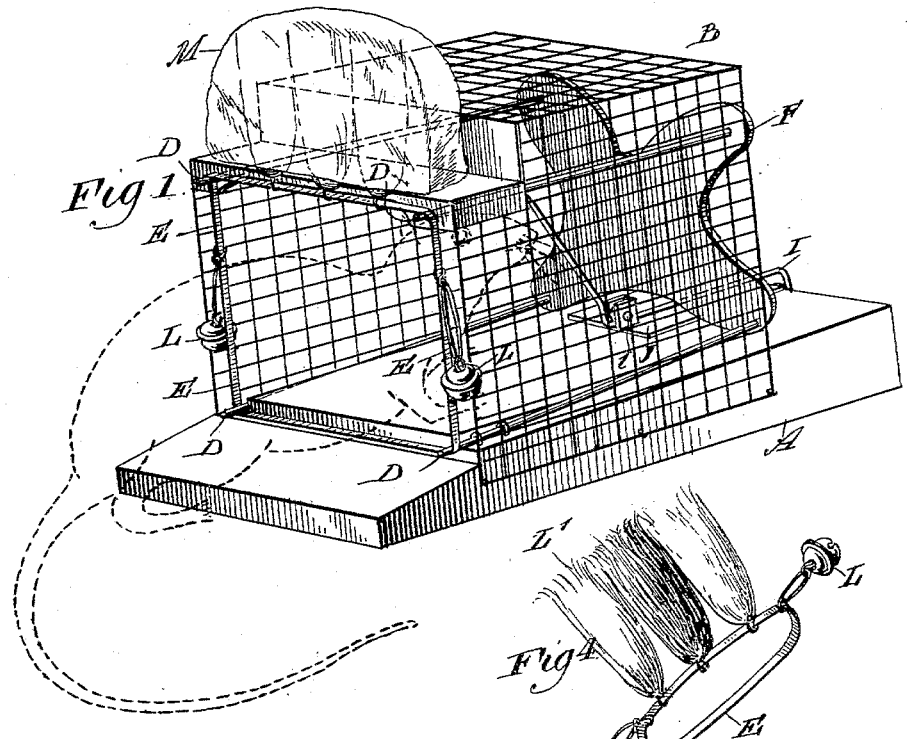
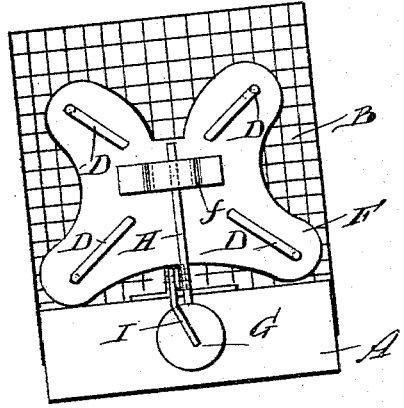
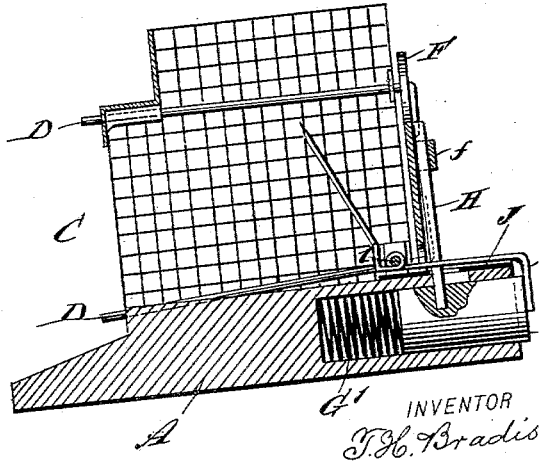
WITNESSES:
Paul Jahst
H. L. Reynolds
INVENTOR
T. H. Bradish
BY
ATTORNEY

UNITED STATES PATENT OFFICE.

THEODORE H. BRADISH, OF UTICA, NEW YORK.

ANIMAL-TRAP.

SPECIFICATION forming part of Letters Patent No. 596,800, dated January 4, 1898.

Application filed March 3, 1897. Serial No. 625,843. (No model.)

*To all whom it may concern:*

Be it known that I, THEODORE H. BRADISH, of Utica, in the county of Oneida and State of New York, have invented a new and Improved Animal-Trap, of which the following is a full, clear, and exact description.

My invention relates to a device having for its object to rid houses and other structures of objectionable animals, such as rats and mice, and is an improvement upon traps which at best are inhuman and cruel, as they kill the animal more or less quickly, subjecting it to torture arising from its imprisonment, as well as the possibly much greater torture arising from the contemplation of its impending fate. These animals soon become very shrewd, and it often happens that after a few have been caught and killed the others become so knowing that it is impossible to tempt them into traps with any kind of bait and they defy persistent efforts to catch and kill them. Moreover, catching one in a trap and killing it disposes only of one animal. To dispose of them all necessitates a continuance of the process. With these disadvantages of the trapping system in mind it has occurred to me that the old tale of the fate of the rat who was decorated with a bell and then turned loose might be turned into practical use and a house be rid of such pests in a humane and expeditious manner and with very little trouble.

The mechanism which I have devised for accomplishing the above-mentioned result is shown in the accompanying drawings, forming a part of this specification, in which—

Figure 1 is a perspective view of my device. Fig. 2 is a rear elevation thereof. Fig. 3 is a longitudinal section of my device, and Fig. 4 is a perspective view of the elastic band and its attachments which is designed to be placed about the rat's body.

The device consists of a base A, having a hole in its rear end, adapted to receive a circular slide G and a spiral spring G', the latter acting to force the slide out of the hole in the base-plate A. This slide G has an arm H fixed thereto and projecting through a slot communicating with the hole occupied by the slide G. This arm H projects up above the base-plate and engages the plate F by means of a bar $f$, which is attached thereto at the ends, but separated in its central portion, thus forming a slot or slide for the reception of the upper end of the bar H.

Mounted upon the base-plate A is a cage or box B, which is preferably made of woven wire. At the end of this cage opposite the plate F is an opening C, designed for the entrance of the rat. Attached to the plate F and extending forward, with their ends projecting from the front face of the cage when the plate is forced close to the rear end of the cage, are four pins or rods D. These pins slide through guides at their outer ends and are of such a length that when the plate F is withdrawn under the influence of the spring G' and its connections thereto the outer ends of the pins will be entirely withdrawn into the cage.

The upper surface of the base A has a plate J, provided with a slot, receiving therein the arm H. This plate is provided with a notch adapted to engage the side of the arm H and hold the same locked. Within the rear end of the cage is a pivot $i$, upon which is pivoted a trigger I. The bait for the trap is placed upon the inner end of this trigger, and the outer end is bent down so as to engage the rear end of the slide G. This serves to hold the spring G' compressed and yet so that it will be easily released when the bait is molested. Any other form of trigger which is found convenient may be substituted for that described.

In using my device the trap is held in the position shown in Figs. 1 and 3. The ends of the bars D project from the end of the trap about the opening C. Upon the projecting ends of the rods an elastic band E is placed, as shown in Fig. 1. This may be an ordinary rubber band, although any material which is elastic and may be stretched sufficiently may be used instead of rubber. To this band are attached small bells L and preferably small bunches or tufts L' of cotton or other material. The tufts may be made of various colors and also may be painted or coated with phosphorescent paint or material which will make them phosphorescent in the dark. The rat, which is outlined by dotted lines in Fig. 1, in eating the bait from the trigger will release the slide G. The spring will then throw the plate F to the rear and withdraw the projecting ends of the pins D, thus releasing the elastic band E. As the rat at this time has his body within the opening of the trap the elastic band will close itself about the body of the rat and he will immediately run away, with the bells tinkling alongside and the plumes waving in the air. He will be so frightened thereby that he is likely to make a tour of all his holes and runways, during which he will meet all of his brethren. His fantastic appearance and the sound of the bells, with the phosphorescent tufts, will frighten the other rats, so that they will scamper away. This being kept up for a short time will drive all the rats away.

If the tufts L' are covered with a phosphorescent material, their appearance may be hidden while the band is attached to the trap by covering the same with a hood M. (Shown in place in Fig. 1.) This hood may be made of paper or cloth and loosely placed about the tufts. It may be secured, if desired, to the trap so that it will be removed by carrying away the band E. This will, however, happen if the paper is placed loosely upon the tufts even if the hood is not secured to the trap.

As it is a comparatively easy matter to catch one or two of a colony of rats, it will be very easy to decorate one or two of these animals, which will be sufficient to create consternation among the remainder and induce them to emigrate. This procedure is much more efficient and humane than killing the rats. The rats which are decorated with the bells will soon become accustomed to their decorations, so that it will not frighten them, while the other rats not having the decorations will be frightened thereby.

It is very evident that this idea of placing an elastic band to which objects, such as bells or tufts of material, are attached may be applied to traps of great variety of construction. I do not therefore wish to limit myself to the use of such a device in connection only with the mechanism herein shown.

Having thus described my invention, I claim as new and desire to secure by Letters Patent—

1. An animal-trap having projecting pins arranged about an opening in the trap, an elastic band supported on the projecting ends of said pins, and means operated by the animal, for withdrawing the pins and permitting the elastic band to close about the body of the animal, substantially as described.

2. In an animal-trap, the combination with a cage having an entrance-opening, and a trigger within the cage, of pins projecting about the opening, an elastic band supported on the projecting ends of said pins, and a connection between the trigger and said pins, whereby the elastic band is released by tripping the trigger, substantially as described.

3. An animal-trap, comprising a cage having an opening in one side, projecting pins surrounding said opening, a spring connected to said pins and adapted when released to retract the pins, an elastic band supported on the projecting ends of said pins and a trigger within the cage adapted to retain the springs and pins in their projecting position and to release them when disturbed, substantially as described.

4. In an animal-trap, the combination with a cage having an opening in one side, pins having projecting ends surrounding said openings and extending through the opposite side of the cage, an elastic band supported on the projecting ends of said pins, a plate connected to and carrying the rear ends of said pins, a spring attached to said plate, and acting to retract the projecting ends of the pins, of a trigger within the cage adapted to engage and hold the plate when the spring is compressed, substantially as described.

5. An animal-trap, comprising an elastic band having attached thereto objects of a terrifying nature, supporting means for retaining the same distended, and means for releasing the same, operated by the animal, substantially as described.

THEO. H. BRADISH.

Witnesses:
A. A. HOPKINS,
H. L. REYNOLDS.